United States Patent
Bowman et al.

(10) Patent No.: US 7,690,336 B2
(45) Date of Patent: Apr. 6, 2010

(54) ADAPTIVE MILLER CYCLE ENGINE

(75) Inventors: Michael John Bowman, Niskayuna, NY (US); Louis Andrew Schick, Delmar, NY (US)

(73) Assignee: General Electric Company, Niskayuna, NY (US)

( * ) Notice: Subject to any disclaimer, the term of this patent is extended or adjusted under 35 U.S.C. 154(b) by 64 days.

(21) Appl. No.: 12/040,225

(22) Filed: Feb. 29, 2008

(65) Prior Publication Data

US 2009/0222194 A1 Sep. 3, 2009

(51) Int. Cl.
F02B 75/04 (2006.01)
(52) U.S. Cl. ............... 123/48 R; 123/90.15; 123/406.3; 123/1 A
(58) Field of Classification Search .................. 123/1 A, 123/27 GE, 525–527, 48 R, 78 R, 90.15, 123/90.16, 406.3
See application file for complete search history.

(56) References Cited

U.S. PATENT DOCUMENTS

| | | | |
|---|---|---|---|
| 5,775,283 A | 7/1998 | Sawai et al. | |
| 6,354,264 B1 | 3/2002 | Iwakiri et al. | |
| 6,530,361 B1 | 3/2003 | Shiraishi et al. | |
| 6,947,830 B1 | 9/2005 | Froloff et al. | |
| 7,167,789 B1 | 1/2007 | Froloff et al. | |
| 7,270,092 B2 * | 9/2007 | Hefley | 123/48 D |
| 2005/0115547 A1 | 6/2005 | Bryant | |
| 2006/0169246 A1 | 8/2006 | Asai | |
| 2007/0245992 A1 * | 10/2007 | Hefley | 123/90.17 |

OTHER PUBLICATIONS

Mingfa Yao, Zunqing Zheng and Jin Qin, "Experimental Study on Homogeneous Charge Compression Ignition Combustion With Fuel of Dimethyl Ether and Natural Gas"; Journal of Engineering for Gas Turbines and Power; Apr. 2006; vol. 128, Issue 2, pp. 414-420.

* cited by examiner

*Primary Examiner*—Hai H Huynh
(74) *Attorney, Agent, or Firm*—Francis T. Coppa

(57) ABSTRACT

A Miller cycle combustion engine capable of operating on multiple fuel types, and a method of operating the engine, is provided. The engine includes a fuel type determiner to determine the fuel type, and a compression adjustor to adjust the compression of a first cylinder of the engine to match the requirement of the determined fuel type. The compression adjustor is a variable valve timing system that provides a maximum compression when a fuel type requiring maximum compression is determined, and that advances or retards the opening of the intake valve to provide lower compression when a fuel type requiring lower compression is determined.

22 Claims, 8 Drawing Sheets

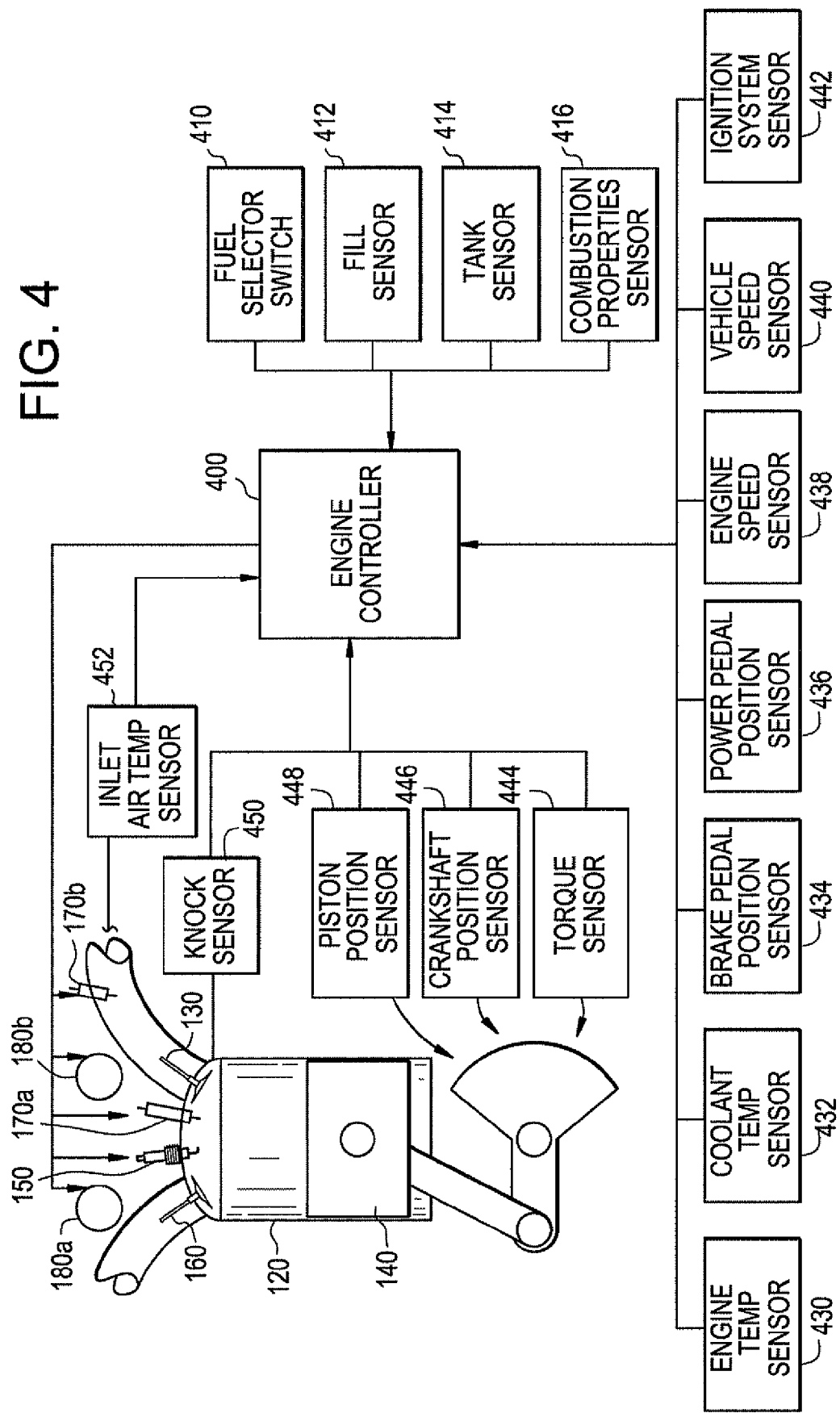

ADAPTIVE MILLER CYCLE ENGINE

BACKGROUND OF THE INVENTION

1. Field of the Invention

Devices, systems, and methods consistent with the invention relate to an internal combustion engine capable of running on multiple types of fuel.

2. Description of the Related Art

Over the last century, the use of internal combustion engines for power and propulsion has become almost universal. The vast majority of today's internal combustion engines are designed to burn gasoline using a four-stroke Otto cycle. As shown in FIGS. 1A-1D, the four steps (or strokes) of this cycle are the: (1) intake stroke (FIG. 1A), where an air/fuel mixture 10 is drawn into the cylinder 20 through an intake valve 30 by the downward movement of piston 40; (2) compression stroke (FIG. 1B), where the air/fuel mixture 10 is compressed by the upward movement of piston 40; (3) power stroke (FIG. 1C), where the air/fuel mixture 10 is ignited by a spark plug 50, and the resulting combustion of the air/fuel mixture 10 (combustion products 12) pushes the piston 40 downward; and (4) exhaust stroke (FIG. 1D), where the upward movement of piston 40 expels the combustion products 12 through an exhaust valve 60.

Today, however, there is increasing pressure to move away from gasoline as a fuel, due to such factors as its relatively high refining cost and deleterious combustion byproducts. Many other types of fuels are therefore competing for supremacy in the marketplace, such as conventional Diesel, Bio-Diesel, Hydrogen, Methane, Liquefied Petroleum Gas (LPG), Liquefied Natural Gas (LNG), ethanol, and methanol. Each can be burned in reciprocating engines with various degrees of efficiency, emissions and source reliability. However, each fuel varies widely in its combustion properties—therefore requiring that an engine utilizing each particular fuel have particular compression, fuel introduction, and ignition parameters. In view of these differences, current technology dictates that different engine designs be optimized and used for each fuel type.

Such narrow operability is inconvenient and inefficient, as end users might desire to utilize whatever fuel is available, or whatever fuel is cheapest. Further, it is highly likely that there will be fragmentation of fuel use across national boundaries, as some countries adopt different strategies for their future fuel needs. Accordingly, there exists a need to provide engines for power and propulsion that can run on a multitude of fuel types, and traverse a wide variety of infrastructures seamlessly.

SUMMARY OF THE INVENTION

In an embodiment of the invention, an internal combustion engine capable of operating on a multitude of different fuels is provided.

According to one aspect of the invention, a Miller cycle combustion engine capable of operating on multiple fuel types is provided, including: a fuel type determiner to determine the fuel type; and a compression adjustor to adjust the compression of the engine to match the requirement of the determined fuel type.

According to another aspect of the invention, a method of controlling a Miller cycle combustion engine capable of operating on multiple fuel types is provided, including: determining a fuel type; and adjusting the compression of the engine to match the requirement of the determined fuel type.

According to another aspect of the invention, a vehicle including a Miller cycle combustion engine capable of operating on multiple fuel types is provided, the Miller cycle engine including: a fuel type determiner to determine the fuel type; and a compression adjustor to adjust the compression of a first cylinder of the engine to match the requirement of the determined fuel type.

According to another aspect of the invention, a generator including a Miller cycle combustion engine capable of operating on multiple fuel types is provided, the Miller cycle engine including: a fuel type determiner to determine the fuel type; and a compression adjustor to adjust the compression of a first cylinder of the engine to match the requirement of the determined fuel type.

BRIEF DESCRIPTION OF THE DRAWINGS

The advantages, nature and various additional features of the invention will appear more fully upon consideration of the illustrative embodiment of the invention which is schematically set forth in the figures, in which:

FIG. 4 is a diagrammatical representation of a system for operating an internal combustion engine according to an exemplary embodiment of the invention;

DETAILED DESCRIPTION OF THE INVENTION

Figure 1A:
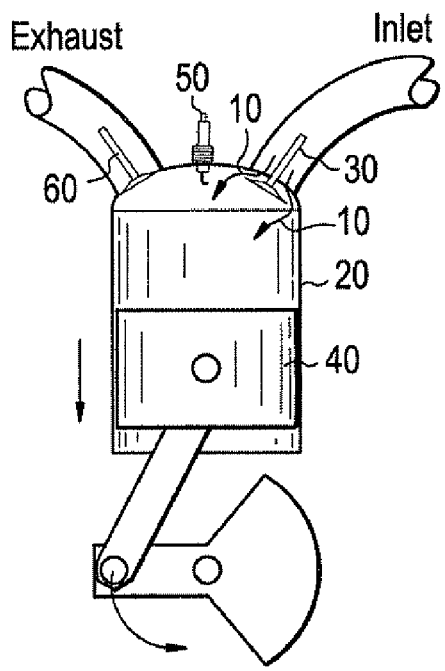
FIGS. 1A-1D are a diagrammatical representation of a cylinder of an internal combustion engine operating according to an Otto cycle.
Figure 1B:
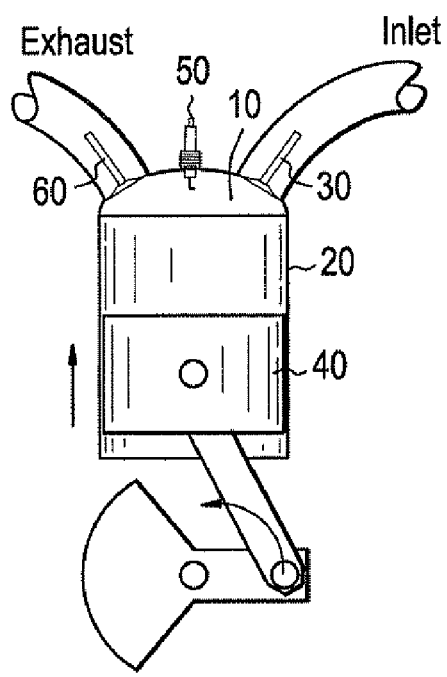
Figure 1C:
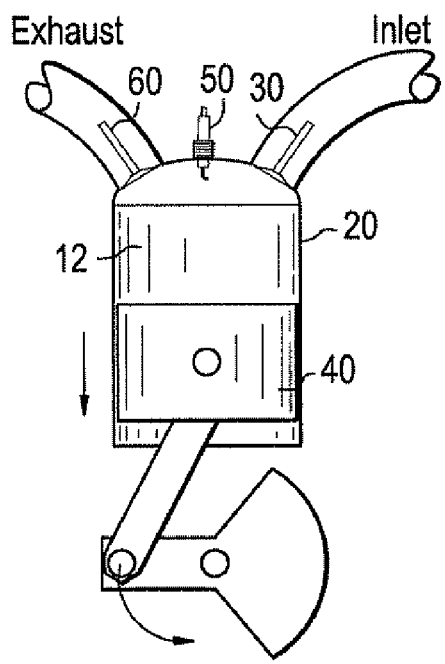
Figure 1D:
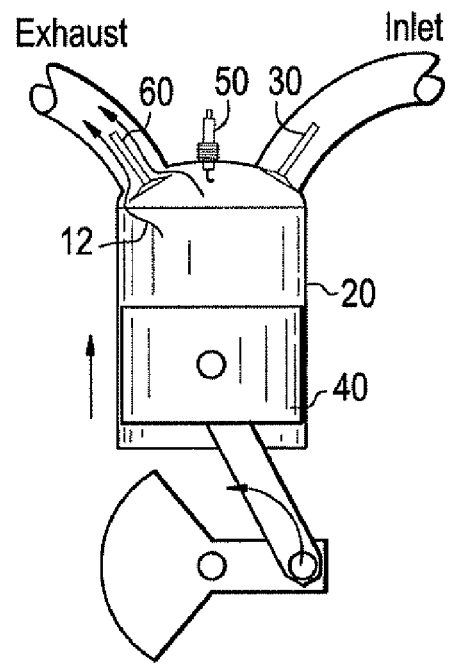
Figure 2A:
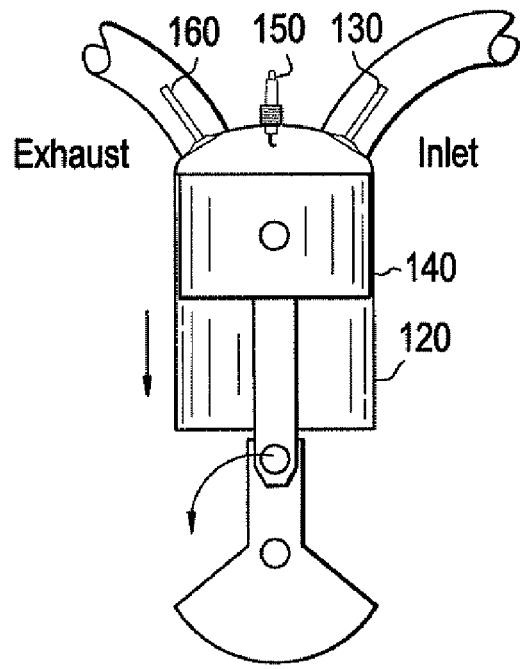
FIGS. 2A-2H are a diagrammatical representation of a cylinder of an internal combustion engine operating according to an exemplary embodiment of the invention.
Figure 2B:
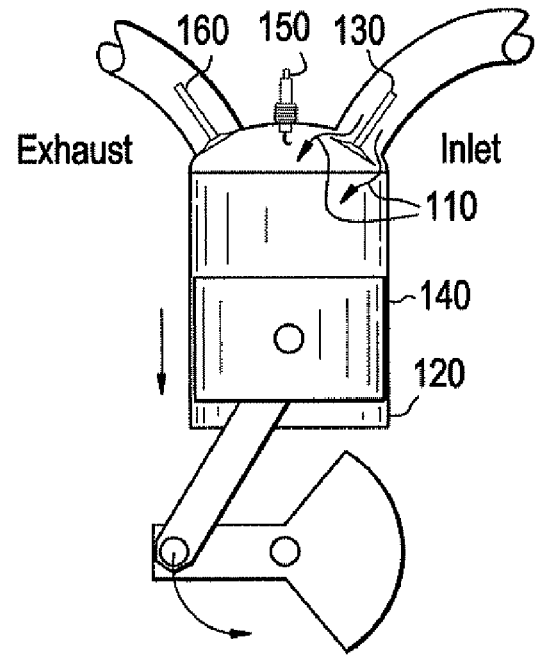
Figure 2C:
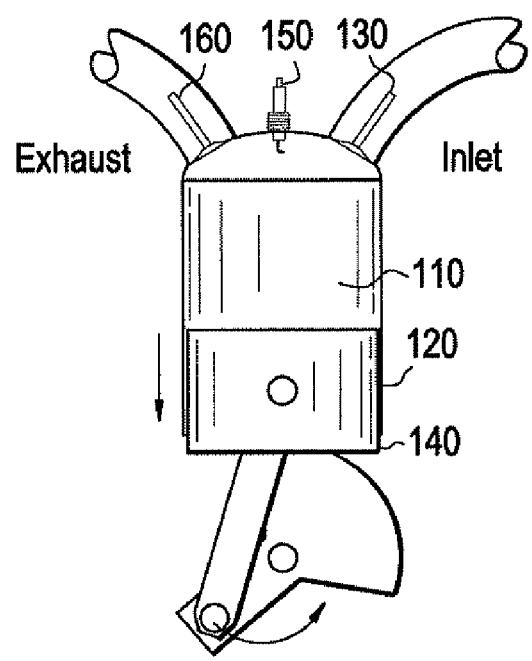
Figure 2D:
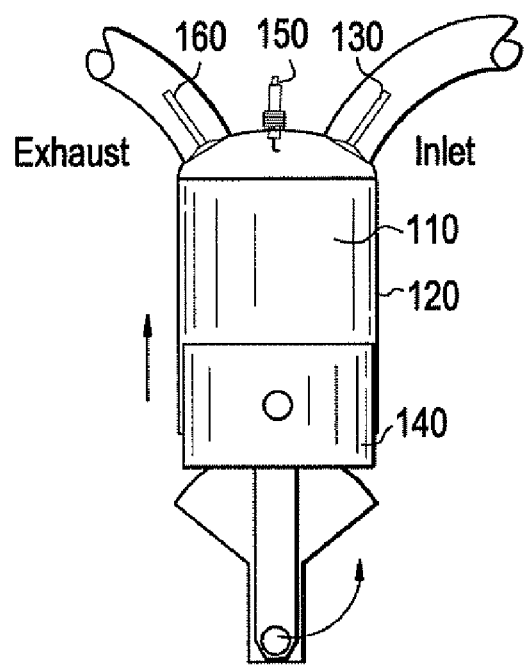
Figure 2E:
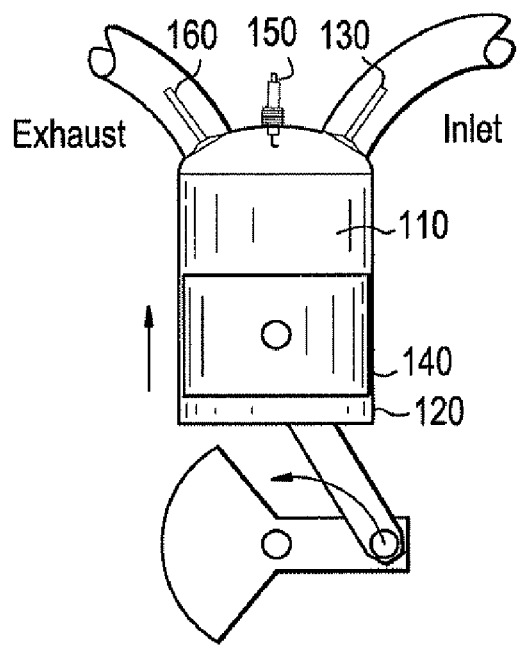
Figure 2F:
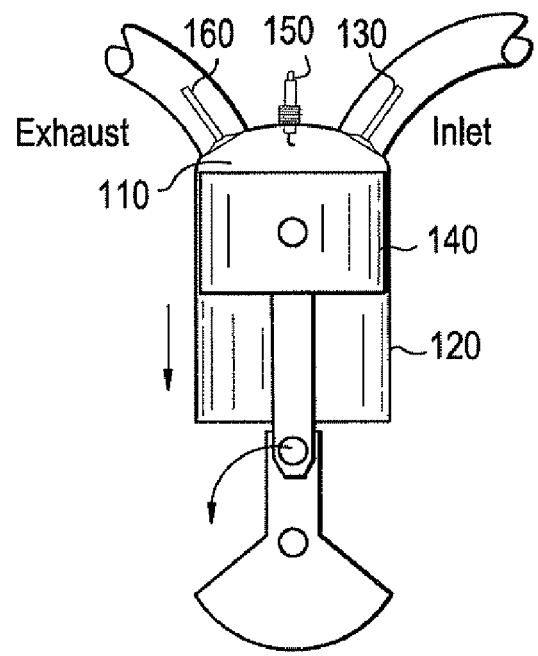
Figure 2G:
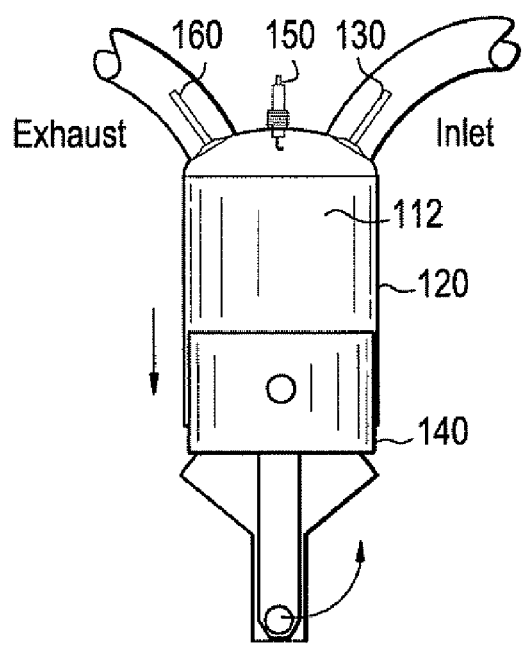
Figure 2H:
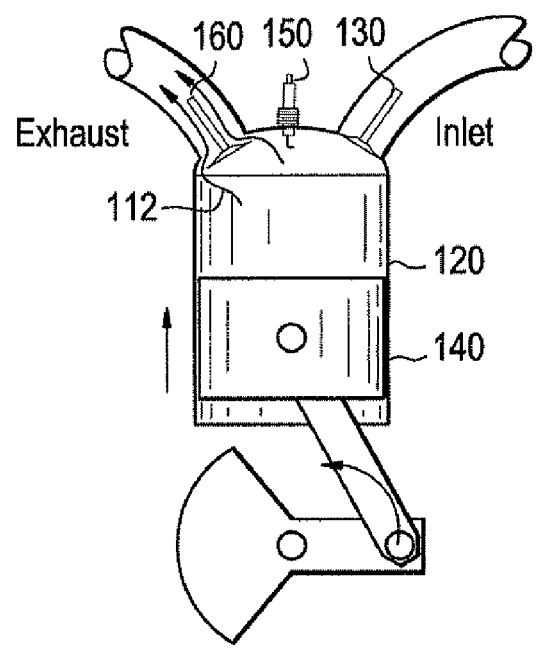
Figure 3A:
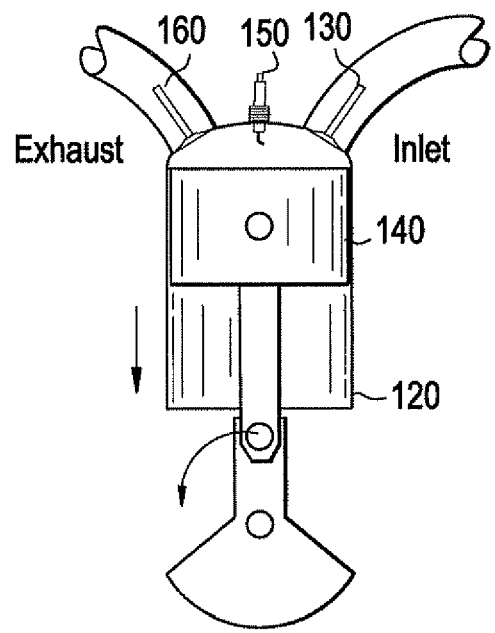
FIGS. 3A-3H are directed to a diagrammatical representation of a cylinder of an internal combustion engine operating according to an exemplary embodiment of the invention.
Figure 3B:
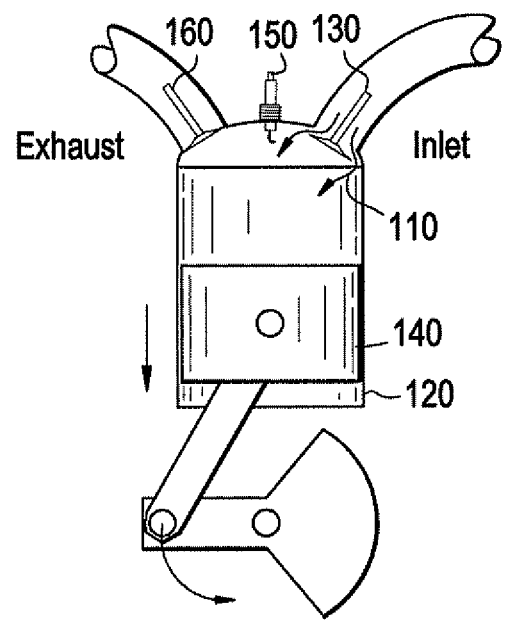
Figure 3C:
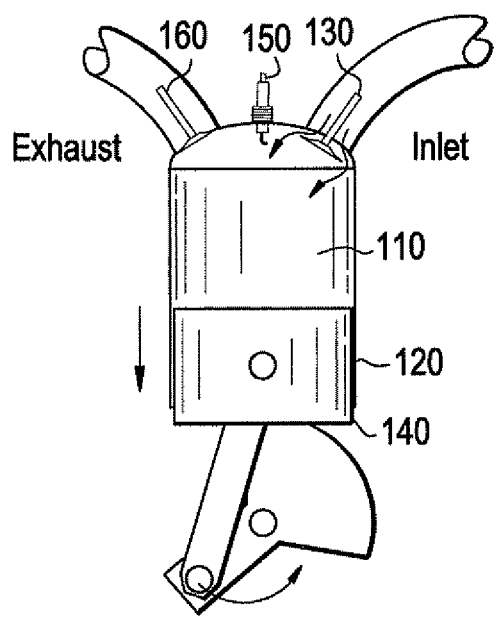
Figure 3D:
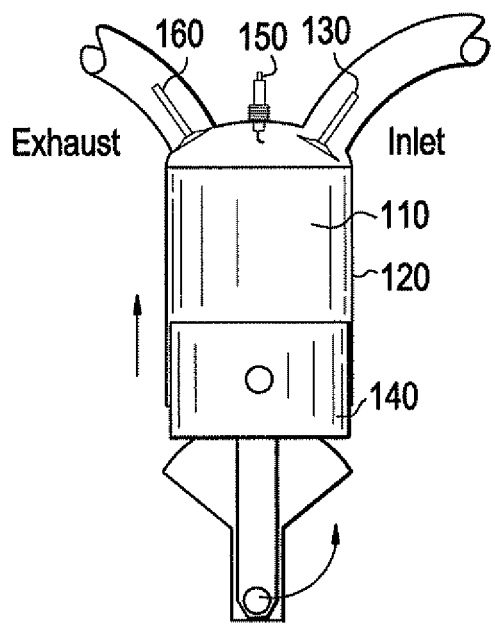
Figure 3E:
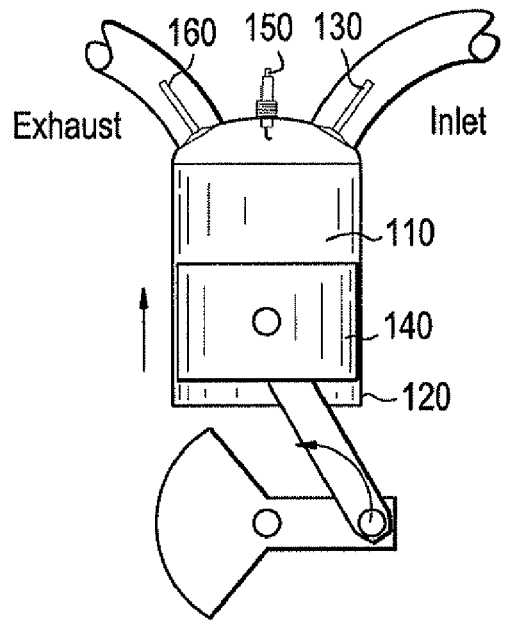
Figure 3F:
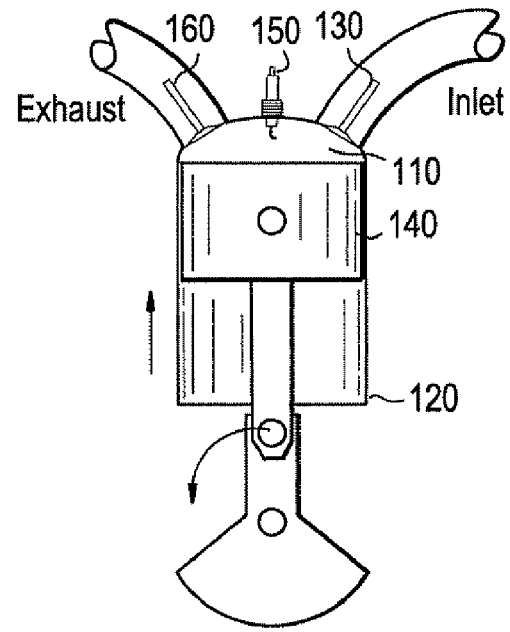
Figure 3G:
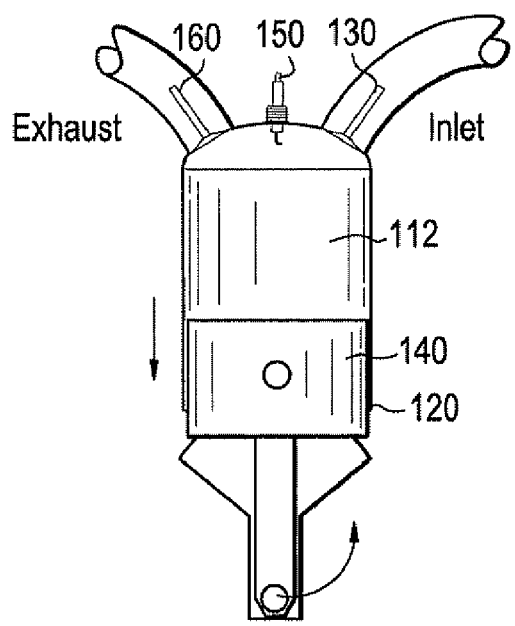
Figure 3H:
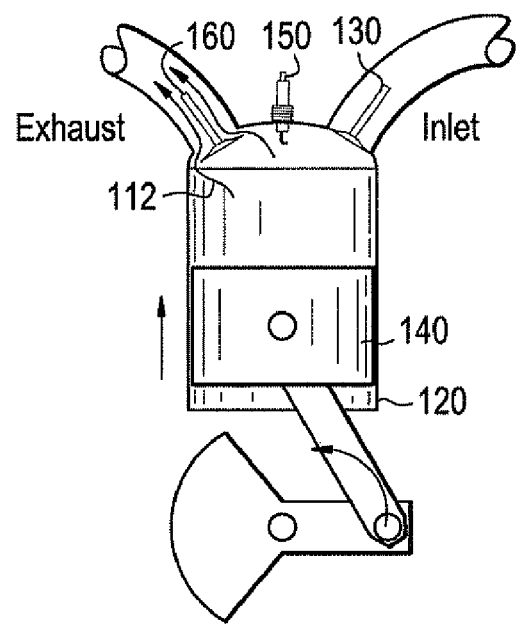

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

As discussed above, many types of fuels may be used in internal combustion engines, such as conventional Diesel, Bio-Diesel, Hydrogen, Methane, LPG, LNG, ethanol, and methanol. Each of these fuels has different combustion properties that must be taken into account when the operating parameters of the internal combustion engine are set. These operating parameters include such variables as compression (i.e., what compression ratio the fuel/air mixture can be compressed to within the cylinder by the piston), fuel introduction (i.e., when the fuel, air or fuel/air mixture is introduced into the cylinder), and ignition timing (i.e., when and if a spark is produced to ignite the fuel/air mixture). Other operating parameters can also vary between fuels.

In the past, engine designs were operable with a single fuel type, or on fuels with similar combustion characteristics. For example, engines designed to run on gasoline could not run on diesel fuel, and engines designed to run on diesel fuel could not run on gasoline. However, it is highly desirable to provide a single engine that can run on many different fuel types with wide combustion characteristics. Such an engine is provided in an exemplary embodiment of the invention by making the engine's operating parameters adjustable.

In the exemplary embodiment, compression is made adjustable by using a combustion cycle based on a four-stroke Miller cycle utilizing variable valve timing (VVT). A Miller cycle is similar to the Otto cycle discussed above (and shown in FIG. 1). However, in a Miller cycle, the intake valve is alternatively closed before the intake stroke is completed, or is left open through the first part of the compression stroke. The result of either alternative is the same—that a volume of air or fuel/air mixture less than the maximum possible volume is retained within the cylinder to be compressed by the piston, which in turn results in a compression ratio lower than the maximum theoretically possible in view of the cylinder volume.

FIGS. 2 and 3 illustrate the steps of the Miller cycle of the exemplary embodiment of the invention in more detail. FIG. 2 illustrates the first alternative Miller cycle discussed above—where the intake valve is closed before the intake stroke is completed. Specifically, FIG. 2A illustrates the transition from exhaust stroke to intake stroke, where both intake valve 130 and exhaust valve 160 are closed, and piston 140 is just about to begin moving downward in cylinder 120. FIG. 2B illustrates the beginning of the intake stroke, where fuel/air mixture 110 is drawn into the cylinder 120 through an intake valve 130 by the downward movement of piston 140. FIG. 2C illustrates a point near the end of the intake stroke, where the intake valve 130 has been closed according to the Miller cycle process. FIG. 2D illustrates the transition between the intake and compression strokes, and shows that the intake valve 130 is still closed. The combination of FIGS. 2C and 2D illustrates the difference between the Miller cycle and Otto cycle of FIG. 1, because FIG. 2D would illustrate the point at which the intake valve 130 would close during an Otto cycle, instead of the point illustrated in FIG. 2C according to the Miller cycle. Next, in FIG. 2E, the air/fuel mixture 110 is compressed by the upward movement of piston 140 during the compression stroke. FIG. 2F illustrates the transition between the compression stroke and power stroke of the engine, and shows where spark plug 150 is activated to ignite the air/fuel mixture 110. FIG. 2G illustrates the power stroke, where the resulting combustion of the air/fuel mixture 110 (combustion products 112) pushes the piston 140 downward. Lastly, FIG. 2H illustrates the exhaust stroke, where the upward movement of piston 140 expels the combustion products 112 through an exhaust valve 160. FIG. 3 illustrates the second alternative Miller cycle discussed above where the intake valve is closed after the intake stroke is completed. FIGS. 3A, 3B and 3F-3H are identical to FIGS. 2A, 2B and 3F-3H. FIGS. 3C-3E illustrate the differences between the alternative Miller cycles. In FIGS. 3C-3E, the intake valve 130 remains open, and does not close until a point between FIGS. 3E and 3F. The effect of the alternative Miller cycles is the same—a reduced compression. Thus, the exemplary embodiment may alternatively utilize either cycle.

The compression provided by the engine of the exemplary embodiment can be widely adjusted by use of VVT, which in turn allows the engine of the exemplary embodiment to utilize many types of fuels. VVT allows the timing of valve closing and opening operations to be adjusted by changing at least one of: the time at which the valves are actuated; the lift of the valves; or the duration that the valves are open. The valves in this exemplary embodiment can be actuated by various methods, such as by mechanical (e.g., a camshaft) or electronic (e.g., a solenoid or fast-acting electro-hydraulic) means.

Figure 5:
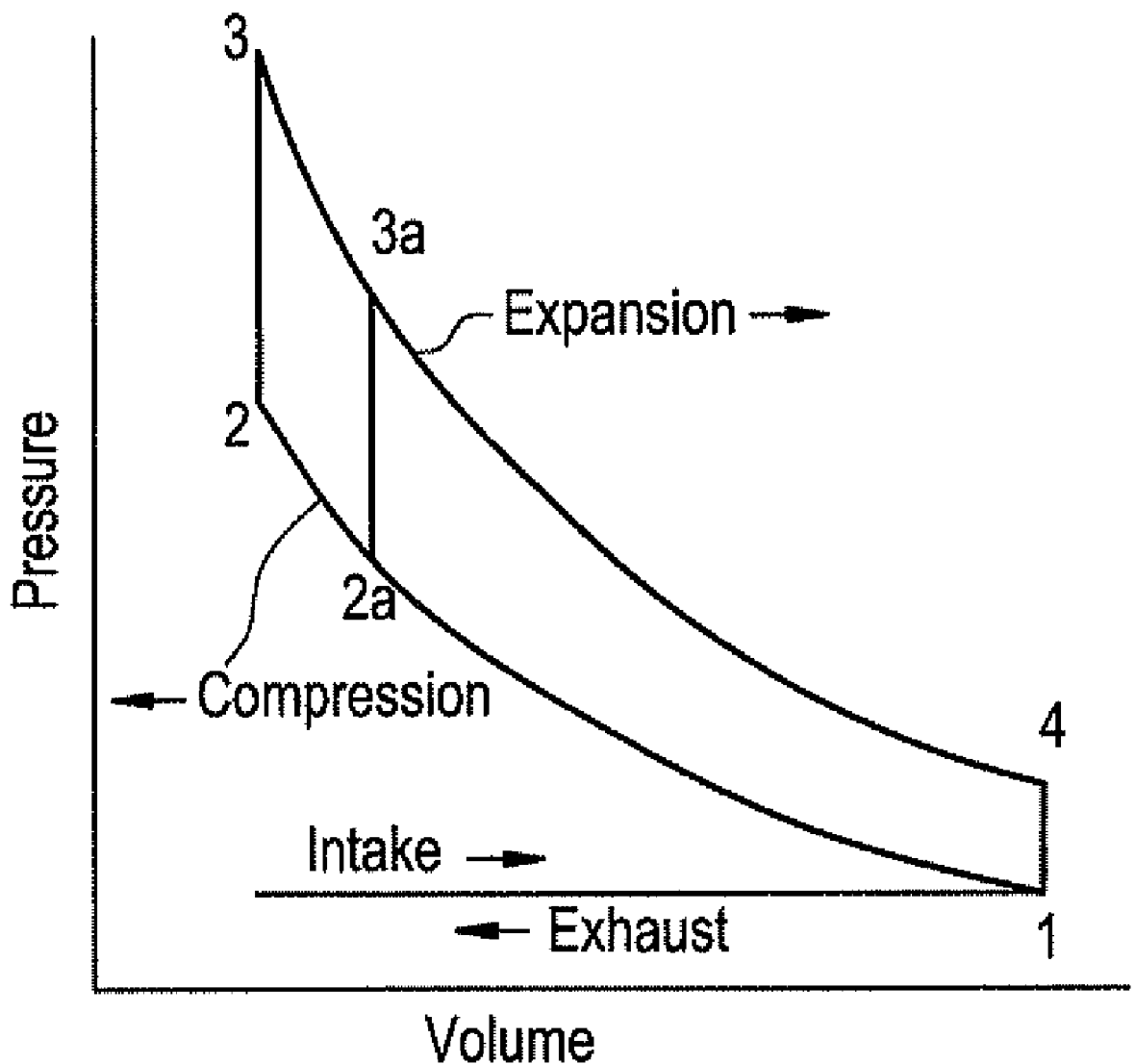
FIG. 5 is a graphical representation of the relationship between pressure and volume.

In this embodiment, a wide range of compressions can be provided by changing the opening or closing times of the intake valve. Lower compression ratios are provided by closing the intake valve earlier during the intake stroke, or later during the compression stroke. This is shown in graphical form in FIG. 5 by combustion occurring through points 2a and 3a. Higher compression ratios are provided by closing the intake valve later in the intake stroke, or earlier in the compression stroke. This is shown in graphical form in FIG. 5 by combustion occurring through points 2 and 3. A maximum possible compression is achieved when the intake valve is closed just as the intake stroke is completed (i.e., when the adjustable Miller cycle most closely approximates an Otto cycle).

In the exemplary embodiment, this maximum compression can be set to correspond to the level required for combustion of the highest knock resistant fuels. For lower knock resistant fuels, the compression can be lowered by incrementally advancing the closing time of the intake valve before the intake stroke is completed, or by incrementally retarding the closing time of the intake valve during the beginning of the compression stroke, via VVT operation. As a matter of example, when a higher compression ratio is required, such as when diesel, hydrogen or alcohol fuel is used, the intake valve will be closed incrementally closer to the point between the intake and compression stroke. In contrast, when a lower compression ratio is required, such as when gasoline is used, the intake valve will be closed either incrementally earlier in the intake stroke, or incrementally later in the compression stroke.

In addition to compression adjustment, the engine of the exemplary embodiment may also include provisions for adjustment of the timing and/or location of the introduction of fuel to provide a combustible fuel/air mixture. Some fuels, such as gasoline, are traditionally mixed with air before being introduced into the cylinder during the intake phase, thereby allowing a combined fuel/air mixture to be drawn into the cylinder. Such fuels require that the fuel delivery system (e.g., a fuel injector) be located outside the cylinder. Other fuels, such as diesel, are mixed with air inside the cylinder near the end of the compression stroke. These fuels requires that the fuel delivery system (e.g., a fuel injector) be located inside the cylinder. Accordingly, to provide maximum flexibility, multiple points for introduction of fuel may be provided with respect to each cylinder in the exemplary embodiment, and an appropriate fuel introduction point can be activated for the fuel type being used. For example, for each cylinder of the exemplary embodiment, a first fuel injector may be positioned at a location outside the cylinder and a second fuel injector may be positioned within the cylinder, and one of the first or second fuel injectors may be used based on the fuel type. Other fuel delivery systems (e.g., carburetion, or throttle body injection) may also be used as needed for functionality or efficiency.

In addition to compression and fuel introduction adjustment, the engine of the exemplary embodiment may also include provisions for adjustment of the ignition process of the compressed fuel/air mixture in the cylinder. Some fuels, such as gasoline, require the use of an ignition source (e.g., a spark plug) to ignite the fuel/air mixture in the cylinder. Other fuels, such as diesel, are ignitable in a fuel/air mixture by compression only. Thus, when these fuels are used, no ignition source is necessary. Accordingly, to provide flexibility, an ignition source may be provided within the cylinder of the engine of the exemplary embodiment and be turned on or off depending on the fuel used. Further, for fuels that require the use of an ignition source, the timing of the ignition may be adjusted to provide optimum efficiency.

In order to provide effective control over the adjustment of the compression, fuel introduction, and ignition parameters, the exemplary embodiment may include an engine controller. The engine controller may adjust these parameters based on a determination of what particular fuel type is being used (e.g., diesel, gasoline, or hydrogen). The engine controller may be constructed in various ways, but generally includes one or more CPUs, controllers, micro controllers, processors, microprocessors, memory, distributed sub-modules, fiber and/or other electronic hardware. As shown in FIG. 4, in order to perform its duties, the engine controller 400 may communicate with a variety of engine control devices, such as fuel injectors 170a, 170b, inlet valve actuator 180b, exhaust valve actuator 180a, and spark plug 150.

The type of fuel being used may be determined in various ways in the exemplary embodiment. In the exemplary embodiment, the engine is installed in a land vehicle, and a user may, for example, select what fuel is being used via a selector switch 410. The switch may be electronic or mechanical, and may be located in the cabin, near the fuel fill location, or anywhere that is convenient for the user. Alternatively, the type of fuel being used may be determined by receipt of a signal, by a receiver 412, from a filling station during fill-up. This signal may be mechanical, such as by interlocking of a particular fuel dispensing nozzle shape, or electronic, such as by radio frequency, hard-line, RFID, or other similar means. As another alternative, the type of fuel may be determined by sensors 414 in the fuel tank or fuel line that measure the properties of the fuel prior to combustion. As still another alternative, the engine controller may determine the type of fuel by measuring the properties of the fuel during combustion via combustion property sensors 416, or the various engine management sensors discussed below. Other methods are also possible. Additionally, combinations of the above methods may also be used to determine the fuel type, or to provide feedback confirmation that the determined fuel type is correct. In any case, when the fuel type is determined, the engine controller may then use this information to modify the engine operating parameters to match the fuel type being used.

In the exemplary embodiment, the engine controller 400 may modify the engine operating parameters in various ways. For example, the engine controller may utilize program logic, lookup tables, feedback from the sensors, or other such decision-making processes to determine or select compression, fuel introduction, and ignition parameters that best match the fuel being used. For example, if the engine controller determines that gasoline is being used as a fuel, it can set the compression to be in the appropriate range for gasoline (e.g. 8:1 to 12:1), the fuel introduction to be either prior to intake of the fuel/air mixture, or during compression (in newly developed direct injection engines), and the ignition to utilize a spark plug firing about the end of the compression stroke. The controller can also monitor the real time feedback from the sensors located on the engine and adjust the intake valve appropriately based on the performance of the engine. This process can also lead to engine optimization on any fuel.

In addition to setting the engine operating parameters to match the fuel used, the engine controller 400 may also be utilized to monitor engine performance after the appropriate operating parameters have been selected. This performance monitoring can be utilized to fine-tune the compression, fuel introduction, or ignition (or other engine operations) based on the actual performance of the engine while using particular fuel. For example, when gasoline is used as a fuel, it is possible that the octane rating may vary during engine operation. This variation can be detected by using knock sensors 450. If the knock sensor 450 detects knock due to, for example, a lower octane fuel being used, the engine controller 400 can adjust the valve timing to eliminate the knock. Similarly, when diesel is used as a fuel, a torque sensor 444 may be utilized to detect power loss during combustion. If such power loss is detected, the engine controller 400 can adjust the valve timing to eliminate the power loss. Other sensors may also be used to monitor engine performance and provide feedback to the engine controller 400, such as engine temperature sensor 430, engine coolant temperature sensor 432, brake pedal position sensor 434, power pedal position sensor 436, engine speed sensor 438, vehicle speed sensor 440, ignition system sensor 442, crankshaft position sensor 446, piston position sensor 448, and inlet air temperature sensor 452. Signals from these sensors may be used to fine-tune the operating parameters.

In the exemplary embodiment a single fuel tank may be used to store any of the fuel types supported. For example, a single fuel tank that is capable of being pressurized may be provided to allow the alternative storage of fuel that requires pressurization (e.g., hydrogen) or fuel that does not require pressurization (e.g., gasoline or diesel). The necessity of application of pressure can be determined in ways similar to that discussed above for determining fuel type. For example, the application of pressure can be determined by a user-operated switch, or by a mechanical or electrical signal from the fuel filling station.

Alternatively, multiple fuel tanks may be provided in the same vehicle. For example, one pressurized and one non-pressurized fuel tank may be provided in the same vehicle, and the appropriate tank can be utilized for fuels that require pressurization, and those that do not. In such a configuration, an ability to choose among the fuel tanks is provided, or is selectable by the engine controller.

As another alternative, multiple fuel tanks can be provided, and each can be capable of pressurization. In such a configuration, these fuel tanks can be used to carry any type of fuel, and keep the fuels physically separate. Again, in such a configuration, an ability to choose among the fuel tanks is provided, or is selectable by the engine controller. This configuration provides an ability to carry multiple fuel types simultaneously.

In some embodiments, it is possible that different fuel types may become mixed in a single fuel tank. Generally, different types of fuels will stratify, or float on each other. Thus, the system can rely upon detection of the fuel type by sensor in the fuel tank of fuel line. Sometimes, however, fuel types will mix. In such a case, the system must vary the combustion parameters constantly. In this case, it is necessary to monitor the combustion parameters closely.

Figure 6:
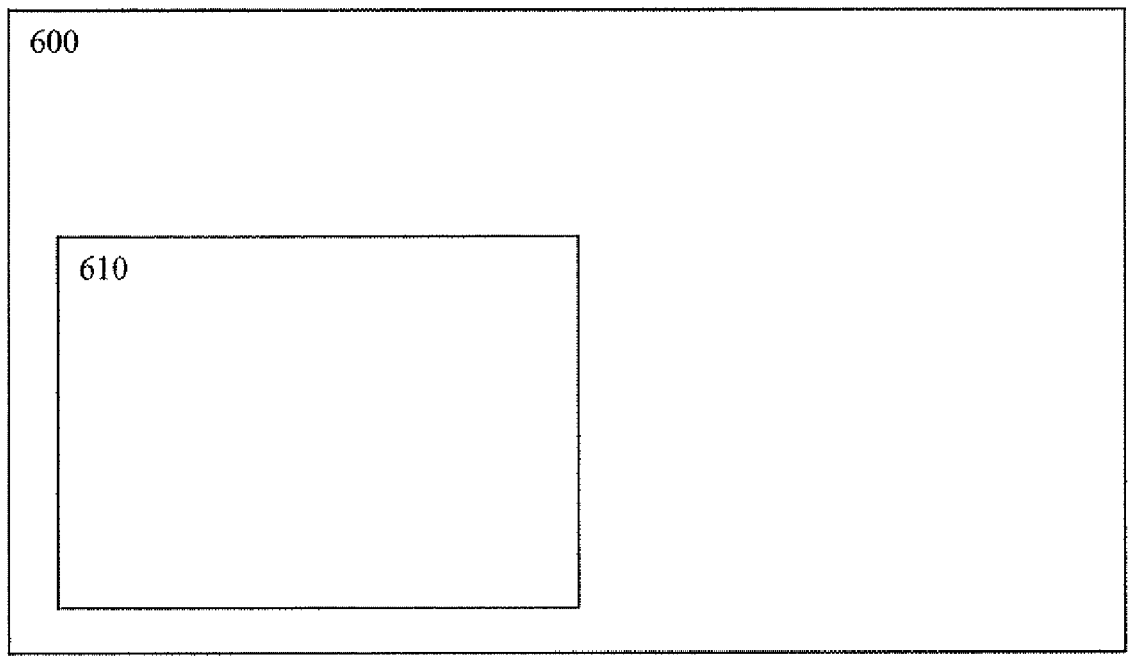
FIG. 6 is a graphical representation of the internal combustion engine according to an exemplary embodiment of the invention arranged in a vehicle.
Figure 7:
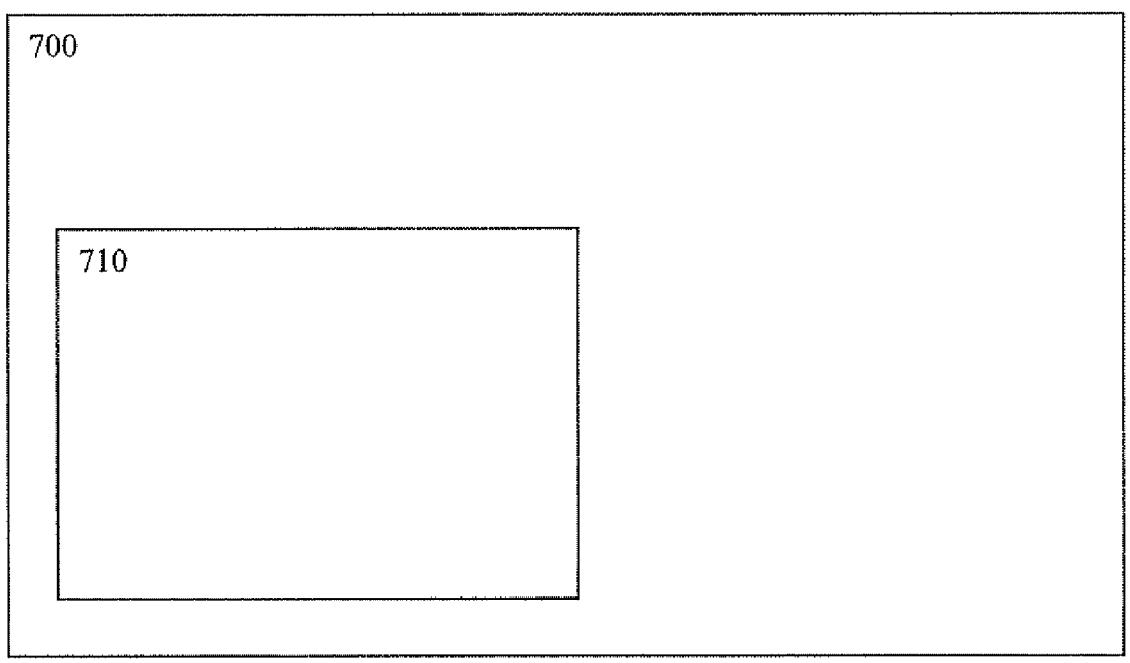
FIG. 7 is a graphical representation of the internal combustion engine according to an exemplary embodiment of the invention arranged in a generator.

In the exemplary embodiment described above, the engine of the invention is provided in a land vehicle. However, the engine of the invention is not limited to such a use. As shown in FIG. 6, a Miller cycle engine 610 according to the invention can be provided in a vehicle 600, where vehicle 600 is any one of a sea, air or land vehicle. Engine 610 can be arranged to provide direct power for the vehicle 600, or could be arranged as part of a hybrid electric drive train. Also, as shown in FIG. 7, a Miller cycle engine 710 according to the invention can be provided in a generator 700. It will be understood by those of ordinary skill in the art how engines 610 and 710 are arranged in, connected to, controlled by, and utilized with vehicle 600 and generator 700, respectively.

The engine of the invention also may be used for any other purpose appropriate for combustion engines.

The types of fuels that may be used in the invention are not limited, and may include vegetable oils, biodiesel, Biobutanol, Bioethanol, Biomethanol, biogas, E85, Hydrogen, DME, DMF, Ammonia, compressed natural gas, liquefied natural gas, liquefied petroleum gas (LPG), LP gas, propane, Synfuel, ethanol.

Internal combustion engines produced according to the invention are highly flexible, and can run on virtually any fuel type currently known. Accordingly, there will be no need for manufacturers to guess as to what fuel will become most prevalent in the future. Further, the invention will allow optimization of efficiency for whatever fuel is used.

While the invention has been particularly shown and described with reference to exemplary embodiments thereof the invention is not limited to these embodiments. It will be understood by those of ordinary skill in the art that various changes in form and details may be made therein without departing from the spirit and scope of the invention as defined by the following claims.

What is claimed is:

1. A Miller cycle combustion engine capable of operating on multiple fuel types, comprising:
   a fuel type determiner configured to receive fuel type identification signals from a plurality of input signal sources selected from a selector switch source operable by a user, a signal receiver source that communicates with a filling station, a fuel tank sensor source, a fuel line sensor source, and a combustion property sensor source to determine the fuel type; and
   a compression adjustor to adjust the compression of a first cylinder of the engine to match the requirement of the determined fuel type.

2. A Miller cycle combustion engine according to claim 1, wherein the compression adjustor comprises variable valve timing.

3. A Miller cycle combustion engine according to claim 2, wherein the variable valve timing is configured to close an intake valve of the first cylinder at a point between intake and compression strokes when a fuel type requiring maximum compression is determined.

4. A Miller cycle combustion engine according to claim 2, wherein the variable valve timing is configured to advance the closing of an intake valve of the first cylinder during an intake stroke when a fuel type requiring less than maximum compression is determined.

5. A Miller cycle combustion engine according to claim 2, wherein the variable valve timing is configured to retard the closing of an intake valve of the first cylinder during a compression stroke when a fuel type requiring less than maximum compression is determined.

6. A Miller cycle combustion engine according to claim 1, further comprising a fuel introduction adjustor to adjust the fuel introduction parameters of the first cylinder of the engine to match the requirement of the determined fuel type.

7. A Miller cycle combustion engine according to claim 1, further comprising an ignition adjustor to adjust the ignition parameters of the first cylinder of the engine to match the requirement of the determined fuel type.

8. A Miller cycle combustion engine according to claim 1, wherein the fuel type comprises at least one fuel selected from the group consisting of gasoline, conventional diesel, bio-diesel, hydrogen, methane, liquefied petroleum gas, liquefied natural gas, ethanol, and methanol.

9. A Miller cycle combustion engine according to claim 1, further comprising multiple fuel tanks.

10. A method of controlling a Miller cycle combustion engine capable of operating on multiple fuel types, comprising:
    determining a fuel type based on fuel type identification signals from a plurality of input signal sources selected from a selector switch source operable by a user, a signal receiver source that communicates with a filling station, a fuel tank sensor source, a fuel line sensor source, and a combustion property sensor source; and
    adjusting the compression of a first cylinder of the engine to match the requirement of the determined fuel type.

11. A method of controlling a Miller cycle combustion engine according to claim 10, wherein the compression is adjusted by variable valve timing.

12. A method of controlling a Miller cycle combustion engine according to claim 11, wherein the variable valve timing closes an intake valve of the first cylinder at a point between intake and compression strokes when a fuel type requiring maximum compression is determined.

13. A method of controlling a Miller cycle combustion engine according to claim 11, wherein the variable valve timing advances the closing of an intake valve of the first cylinder during an intake stroke when a fuel type requiring less than maximum compression is determined.

14. A method of controlling a Miller cycle combustion engine according to claim 11, wherein the variable valve timing retards the closing of an intake valve of the first cylinder during a compression stroke when a fuel type requiring less than maximum compression is determined.

15. A method of controlling a Miller cycle combustion engine according to claim 10, further comprising adjusting the fuel introduction parameters of the first cylinder of the engine to match the requirement of the determined fuel type.

16. A method of controlling a Miller cycle combustion engine according to claim 10, further comprising adjusting the ignition parameters of the first cylinder of the engine to match the requirement of the determined fuel type.

17. A method of controlling a Miller cycle combustion engine according to claim 10, wherein determining the fuel type comprises one or more of: a user operating a switch; receiving a signal from a filling station; sensing via a fuel tank sensor; sensing via a fuel line sensor; or sensing via a combustion property sensor.

18. A method of controlling a Miller cycle combustion engine according to claim 10, wherein the fuel type comprises at least one fuel selected from the group consisting of gasoline, conventional diesel, bio-diesel, hydrogen, methane, liquefied petroleum gas, liquefied natural gas, ethanol, and methanol.

19. A method of controlling a Miller cycle combustion engine according to claim 10, further comprising delivering the fuel type from one of multiple fuel tanks.

20. A vehicle comprising a Miller cycle combustion engine capable of operating on multiple fuel types, the Miller cycle engine comprising:
    a fuel type determiner configured to receive fuel type identification signals from a plurality of input signal sources selected from a selector switch source operable by a user, a signal receiver source that communicates with a filling station, a fuel tank sensor source, a fuel line sensor source, and a combustion property sensor source to determine the fuel type; and
    a compression adjustor to adjust the compression of a first cylinder of the engine to match the requirement of the determined fuel type.

21. A vehicle comprising a Miller cycle combustion engine capable of operating on multiple fuel types according to claim 20, the vehicle comprising one of a land vehicle; an air vehicle; or a sea vehicle.

22. A generator comprising a Miller cycle combustion engine capable of operating on multiple fuel types, the Miller cycle engine comprising:

a fuel type determiner configured to receive fuel type identification signals from a plurality of input signal sources selected from a selector switch source operable by a user, a signal receiver source that communicates with a filling station, a fuel tank sensor source, a fuel line sensor source, and a combustion property sensor source to determine the fuel type; and a compression adjustor to adjust the compression of a first cylinder of the engine to match the requirement of the determined fuel type.

* * * * *